United States Patent [19]
Goldman et al.

[11] Patent Number: 5,917,424
[45] Date of Patent: Jun. 29, 1999

[54] DUPLICATE PAGE SENSOR SYSTEM AND METHOD

[75] Inventors: Shelley Betty Goldman, East Brunswick; David Phillip Silverman, Somerville, both of N.J.

[73] Assignee: AT & T Corp, Middletown, N.J.

[21] Appl. No.: 08/778,374

[22] Filed: Dec. 31, 1996

[51] Int. Cl.[6] .............................. G08B 5/22; H04B 7/00
[52] U.S. Cl. .................................... 340/825.44; 455/38.2; 455/38.1
[58] Field of Search .................. 340/825.44, 825.71, 340/825.69; 371/32, 33; 455/38.1, 38.2; 379/142

[56] References Cited

U.S. PATENT DOCUMENTS

| | | | |
|---|---|---|---|
| 5,168,271 | 12/1992 | Hoff | 340/825.44 |
| 5,347,269 | 9/1994 | Vanden Heuvel et al. | 340/825.44 |
| 5,384,565 | 1/1995 | Cannon | 340/825.44 |
| 5,502,761 | 3/1996 | Duncan et al. | 379/142 |
| 5,596,318 | 1/1997 | Mitchell | 340/825.44 |

*Primary Examiner*—Brian Zimmerman
*Assistant Examiner*—Anthony A. Asongwed

[57] ABSTRACT

A system and method of using one-way or two-way paging to establish communications with a mobile party and sensing duplicate pages. A one-way or two-way paging device operates to compare an incoming page with pages that have been received within a predetermined, and preferably subscriber adjustable, time interval. If the incoming page is determined as being identical to a page received and stored by the pager within the preceding predetermined time interval, then the incoming page is deemed a duplicate page, and is therefore disregarded. If the incoming page is determined as not being identical to any pages received within the predetermined time interval, then the page is deemed a new page, which is stored by the pager for comparison to any pages subsequently received within the predetermined time interval, and the paging device notifies the subscriber of the new page. In another embodiment, when a page is sent out to a two-way paging device by the paging system, the paging system updates a database which contains paging information for pages sent out to each subscriber. A two-way paging device that identifies an apparent duplicate page sends a reverse page query to the paging system, requesting confirmation as to the invalidity of the apparent duplicate page. The reverse page includes information that identifies the apparent duplicate page, and the paging system compares this information with that stored in the database to determine whether two separate pages matching the apparent duplicate page were transmitted by the paging system.

20 Claims, 6 Drawing Sheets

DUPLICATE PAGE SENSOR SYSTEM AND METHOD

CROSS-REFERENCE TO RELATED APPLICATIONS

This application is related to the following commonly assigned, pending U.S. patent applications which are herein incorporated by reference: Ser. No. 08/379,425, entitled SYSTEM AND METHOD FOR ESTABLISHING COMMUNICATIONS WITH A MOBILE PARTY, now abandoned; Ser. No. 08/379,430, entitled SYSTEM AND METHOD FOR ESTABLISHING COMMUNICATIONS OVER A NETWORK, now abandoned; and Ser. Nos. 08/579,539, now allowed, and 08/579,184, now pending, each entitled COMMUNICATION SYSTEM AND METHOD USING TWO-WAY PAGING TO PROVIDE CALL CONTROL.

TECHNICAL FIELD

This invention relates to communications systems, and more particularly to paging technology for establishing communications with a mobile party.

BACKGROUND OF THE INVENTION

In a paging system, a mobile individual carries a portable pager. Typically, the pager is assigned a telephone number and is capable of receiving a predetermined radio signal. When a caller dials the pager's number the predetermined radio signal is broadcast and the pager responds to the signal by activating an audible and/or visual alarm. The alarm serves to alert the mobile individual that an attempt has been made to contact the mobile individual. Often, the caller's telephone number will be included in the radio signal so that the pager can record the caller's number and the called party can initiate a return call at some later time. One of the drawbacks of past paging systems is that they do not usually support two-way communication. Thus, in a typical paging scenario, the called party must relocate and initiate a return call to establish full two-way communication with the calling party. Such relocation may be inconvenient and untimely resulting in "telephone tag"—situations in which two individuals periodically try to contact one another and fail because the other person is unavailable.

Another drawback of past paging systems is the delay associated with the paging queue. In general, a paging service can only transmit one page at a time. However, a service usually receives many paging requests at once. Consequently, a queue builds up at the service's broadcast facility and a delay in paging throughput times results. This problem is compounded in paging services that offer national coverage to their subscribers. In such services a subscriber's pages are broadcast from several facilities, and therefore a delay in throughput times results at each facility.

The inventions disclosed in the Ser. No.: 08/379,425 and Ser. No.: 08/379,430 applications (the '425 and '430 applications, respectively), cited hereinabove, address many of the foregoing disadvantages of prior systems used to communicate with mobile individuals. Both of those inventions describe a call forwarding scheme in which each subscriber is assigned a Personal Telephone Number (PTN) and uses a two-way pager to forward calls placed to that number. In both cases, when a call is placed to the subscriber's PTN, a network database query is generated and information about how to handle the call is retrieved (referred to as "registration" type forwarding). In the '425 invention, the subscriber's pager number is retrieved from the database, the subscriber is paged, and the subscriber transmits a forwarding number back to the network via the two-way pager (referred to as "call-by-call" type forwarding). In the '430 invention, call forwarding may be carried out in the same way it is in the '425 invention, or, as an alternative, the forwarding number may be retrieved on the initial database query, thereby obviating the need to page the subscriber. The '425 and '430 inventions possess many advantages over prior call forwarding systems, and were therefore incorporated into the invention disclosed in application Ser. No. 08/579,539 (the '539 invention), which not only realized all of the advantages of the '425 and '430 inventions, but improved upon them by increasing the efficiency and flexibility of the call forwarding service offered.

One way in which the '539 invention improves upon the '425 and '430 inventions is by using the two-way pager to provide the bandwidth and protocol of the terminating station, which allows the network to allocate a communication channel for the forwarded call that is matched to the bandwidth and/or protocol of the terminating station, and to establish communications with the terminating station via the specified protocol.

Another way in which the '539 invention improves upon the '425 and '430 inventions is by incorporating the ability to perform secondary forwarding, revertive forwarding, and caller examination forwarding. Secondary forwarding refers to the forwarding of a call that has already been routed, or that has already received answer supervision. By incorporating secondary forwarding the burden on network resources may be reduced in that calls do not have to be held at a point in the network (or "parked") while they await forwarding, but rather routing may proceed as usual until a call forwarding signal is received, if such a signal is received at all. Furthermore, secondary forwarding provides additional call forwarding flexibility. For example, a subscriber may use the two-way pager to forward a call to a first terminating station where the call is answered, wait a period of time, and then use the two-way pager to forward the call to a second telephone station.

The revertive calling and caller examination procedures provide further flexibility by giving the subscriber two additional call forwarding procedures from which to choose. If the subscriber prefers to answer a call by initiating a revertive call from the desired terminating station, rather than by "picking up" the call at a predetermined terminating station, then the subscriber uses the two way pager to invoke the revertive calling procedure. If the subscriber wishes to have an incoming call automatically forwarded to a terminating station having a bandwidth and protocol corresponding to the bandwidth and protocol of the incoming call, then the subscriber uses the two way pager to invoke the caller examination procedure.

The invention of application Ser. No. 08/579,184 (the '184 invention) further enhances and improves the features and advantages of the '425, '430, and '539 inventions, by providing a call handling treatment for situations in which the subscriber is unable, or unwilling, to respond to a call-by-call alerting page. In such "subscriber unavailable" situations inadequate call treatment can waste network resources and result in the subscriber missing important calls. For example, consider a situation in which a subscriber goes to work and leaves her two-way pager at home. If the subscriber has specified call-by-call mode and a call is placed to the subscriber's PTN then the network will hold the call, page the subscriber, and await a response. A response, however, will not be provided since the subscriber is unavailable. One way to handle such a situation is to automatically forward the call to voice mail following a predetermined "time out" period.

Although a time out procedure provides a method for dealing with the subscriber unavailable problem, the procedure has drawbacks. One drawback of the time out procedure is that it requires that an unnecessary page be sent. If a subscriber could be recognized as unavailable prior to paging the subscriber, then the unnecessary page, and all the steps that go into generating that page, could be avoided, thereby freeing up the resources required to generate the page. Another drawback of the time out procedure is that there exists a possibility that a caller will not hold for the duration of the time out period, in which case the subscriber will "miss" the call.

The '184 invention overcomes these, and other, drawbacks by designing the two-way pager such that the paging service can determine whether the pager is on or off prior to sending a page. Such a determination may be made by the paging service alone or by the paging service in response to a request from the network, but whatever the case, the results of the determination may be stored by the paging service, by the network, or by some combination of the two. When it has been determined that the two-way pager of a call-by-call mode subscriber has been turned off, calls to that subscriber do not generate a page, but rather, they are forwarded to some predetermined forwarding number. In a preferred embodiment, the pager is equipped with an "automatic turn off", such as a body temperature sensor which turns the pager off when the pager is not being worn. Thus, a subscriber who is not wearing the pager, either inadvertently or deliberately, will not be paged in response to an incoming call and the call will be forwarded to a default number so that the subscriber does not "miss" the call. In any event, the network is apprised of a "pager off" status prior to generating a call-by-call alerting signal, thereby avoiding the allocation of network and/or paging service resources to the generation of a page that will not be received. Moreover, when the pager is equipped with the "automatic off" feature of the preferred embodiment, unnecessary pages and missed calls can be avoided in those situations where the subscriber is not carrying the pager but has neglected to turn the pager off.

Although such two-way paging systems apparently provide many advantages for mobile communication, they also are susceptible to deleterious effects from duplicate pages. A duplicate page may arise from various sources, including multi-path length transmission from a single paging station, and reception of a common page transmitted from more than one paging station. If the pager or mobile user does not or cannot recognize the second or subsequent page as being actually a duplicate or replica of a previously received page (i.e. the same page delayed in time), then any difference invoked by the subscriber between handling the original page and handling the duplicate page may result in inconvenience and confusion for both caller and subscriber, as well as in possibly a lost call. For instance, in response to an original page a subscriber may choose to forward the call to a first location having an answering machine. Then, upon receiving the duplicate page, the subscriber may choose to answer the page via a revertive call. Accordingly, since the original call has been, or is being routed, the network must "mid-stride" adjust to the alternative instruction for handling. These "mid-stride" adjustments by the network may also result in call routing errors even if the subscriber sends the same instruction for handling the original and duplicate pages. In addition, paging system and network system resources are wasted by handling of the signal transmitted from the subscriber to the paging service and network (referred to herein as a "reverse page") to specify call handling in response to a duplicate (i.e., not actual) page, and these resources are wasted even if the network disregards the second instruction.

Accordingly, in such two-way paging systems, it would be advantageous to prevent any return page from being sent by the mobile user in response to a duplicate page, or at least to minimize the impact of such duplicate pages on the paging service and network system resource allocation as well as on the network call handling itself. Such duplicate pages are also problems (e.g., inconvenience to subscriber) in conventional one-way paging systems; however, in such systems duplicate pages represent a less severe problem than for two-way paging systems because there are no reverse pages and concomitantly no provisions for call handling functions, such as call forwarding, in response to such reverse pages.

In any event, there is a need for an improved paging system which mitigates or eliminates duplicate pages, and this need is magnified by two-way paging systems.

SUMMARY OF THE INVENTION

The present invention overcomes the above, and other limitations, by providing a paging system that detects duplicate pages. The present invention may be practiced in accordance with both one-way and two-way paging communication systems. Generally, such paging communications systems are provided by a paging system coupled to a public switched telephone network. A subscriber of a paging service has a pager which is associated with a predetermined telephone number. A caller wishing to reach the subscriber dials the predetermined telephone number, and the public switched telephone network routes the call to the paging service. The paging service then generates a paging signal which is received by the subscriber's pager, which notifies the subscriber of the incoming page.

In a first embodiment of the present invention, a one-way or two-way paging device operates to compare an incoming page with pages that have been received within a predetermined, and preferably subscriber adjustable, time interval. If the incoming page is determined as being identical to a page received and stored by the pager within the preceding predetermined time interval, then the incoming page is deemed a duplicate page, and is therefore disregarded. If the incoming page is determined as not being identical to any pages received within the predetermined time interval, then the page is deemed a new page, which is stored by the pager for comparison to any pages subsequently received within the predetermined time interval, and the paging device notifies the subscriber of the new page.

Another embodiment of the present invention is practiced in accordance with a two-way paging system. In this embodiment, a mobile person is equipped with a two-way pager and is assigned a Personal Telephone Number (PTN). The mobile person uses the pager to transmit one of several available types of forwarding signals to a paging service and/or network via the paging service. These reverse paging signals may be generated by the mobile user as a response to a paging signal received by the two-way pager, or by the mobile user as an instruction to the paging system and/or network before any incoming paging signal is received. Preferably, the two-way paging system is provided according to the above-cited patent applications, and includes the registration, call-by-call forwarding, secondary forwarding, revertive calling, and pager status detection features disclosed therein.

In this second embodiment, when a page is sent out to the paging device by the paging system, the paging system updates a database which contains paging information for pages sent out to each subscriber. Upon receiving an incoming page signal, the subscriber's two-way paging device compares the incoming pages with pages stored in the two-way paging device that were received within a preceding predetermined time interval, to ascertain whether the incoming page is identical to any of these stored pages. If the incoming page is determined as not being identical to any pages received within the predetermined time interval, then the page is deemed a new page, which is stored by the pager for comparison to any pages subsequently received within the predetermined time interval, and the paging device notifies the subscriber of the new page.

If the incoming page is determined as being identical to a page received and stored by the pager within the preceding predetermined time interval, then the incoming page is deemed an apparent duplicate page. In response to the apparent duplicate page detected by the two-way pager, the two-way pager sends a reverse page query to the paging system, requesting confirmation as to the invalidity of the apparent duplicate page. The reverse page includes information that identifies the apparent duplicate page, and the paging system compares this information with that stored in the database to determine whether two separate pages matching the apparent duplicate page were transmitted by the paging system, thus indicating that the apparent duplicate page is actually a valid original page, or whether only one page corresponding to the paging information was transmitted by the paging system, and thus that the apparent duplicate page is actually a duplicate page.

The paging system then sends a duplicate page validity signal, indicative of the validity or invalidity of the apparent duplicate page as an actual original page, to the two-way pager. If the second page is confirmed as a valid page, then the two-way pager notifies the subscriber of the second page, and/or stores the second page for retrieval by the subscriber. If the second page is confirmed as an invalid page, the two-way pager disregards the second page.

BRIEF DESCRIPTION OF THE DRAWINGS

The invention will be described in greater detail below by way of reference to the accompanying drawings, wherein.

DETAILED DESCRIPTION

The present invention mitigates the inconvenient as well as deleterious effects of duplicate pages received by a paging device. This system and method, herein referred to as a pager duplicate sensor, is applicable to both one-way pagers (i.e. pager receives only) and two-way pagers (i.e., pager receives and transmits), but realizes greater efficacy in two-way pagers and their associated systems, such as those disclosed in the above-cited related patent applications which are herein incorporated by reference. Prior to describing various pager duplicate sensor embodiments, first there are described hereinbelow, with reference to FIG. 1 and FIG. 2, examples of communication systems that include two-way paging, and are well-suited for implementing a pager duplicate sensor according to the present invention. It will be understood, however, that conventional one-way paging systems may also incorporate a pager duplicate sensor.

Figure 1:
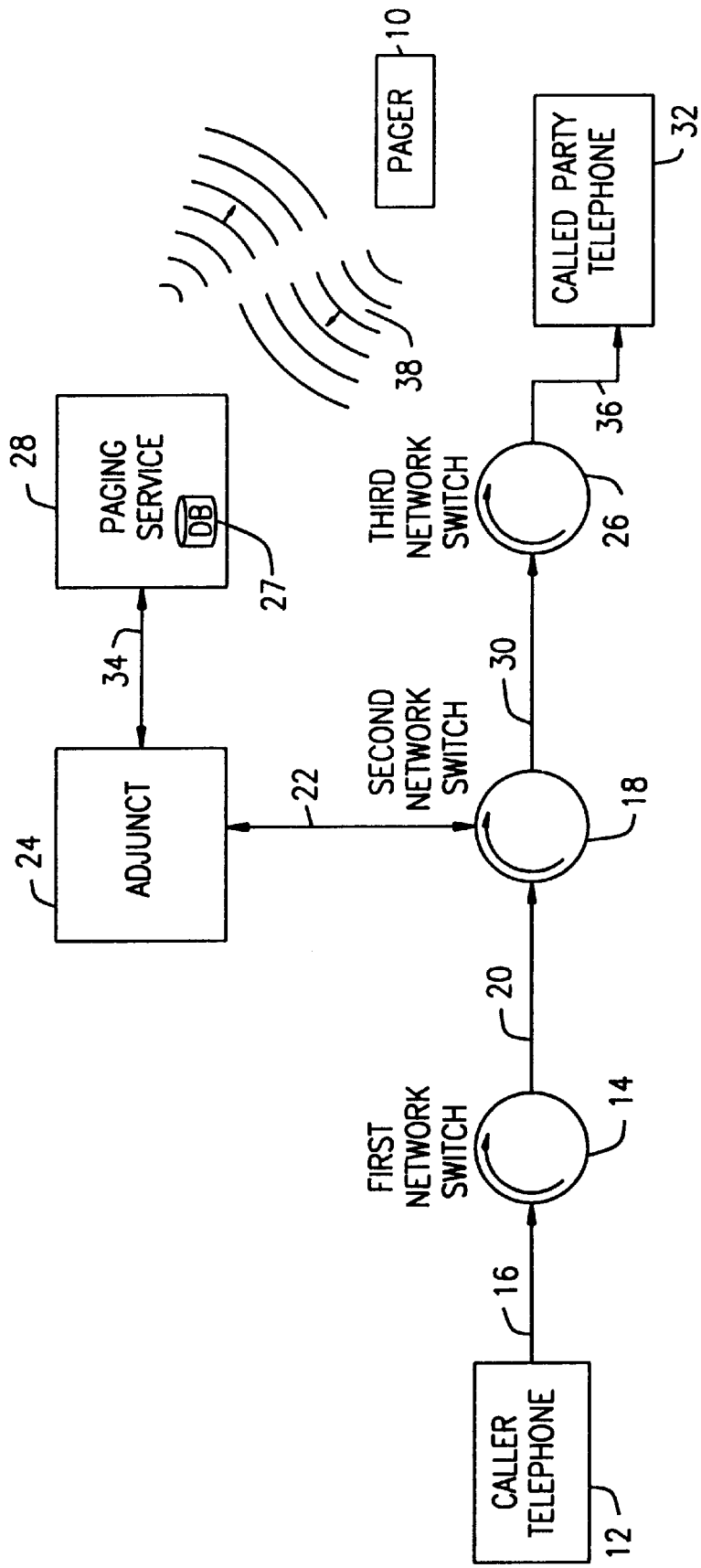
FIG. 1 is a block-schematic diagram of a communication system that may be used in accordance with the present invention.

Referring to FIG. 1, there is shown a block diagram of a communication system which preferably provides two-way paging, and may also include one-way paging, and incorporates the present invention. As shown in the figure, a caller initiates a call from a caller telephone 12 to a mobile party who is equipped with a two-way pager 10. At this point it should be noted that the caller telephone, like all other telephones hereinafter discussed, is used merely as an illustration, and that the invention may be implemented using a variety of communication devices, including, but not limited to telephones, computers, and facsimile machines.

The caller telephone is coupled to a first network switch 14 by a first communication coupling 16. First communication coupling 16, and all communication couplings hereinafter described, may take the form of a telephone line, twisted pair line, coaxial cable, fiber optic line, wireless link, or any other type of communication coupling. The first network switch is, in turn, coupled to a second network switch 18 by a second communication coupling 20. The second network switch is coupled to an adjunct 24, via third communication couplings 22, and to a third network switch 26, via fourth communication coupling 30. Thus, there is a path between the caller telephone and the adjunct, and a path between the caller telephone and the third network switch.

Adjunct 24 is an intelligent component external to the network and connected to the network in the same way that a switch or telephone is connected. Examples of an external adjunct include the AT&T Voice Response Units (VRUs), such as a Conversant, and the Summa Four. Two possible ways of connecting the adjunct to a network are: via a Common Channel Interoffice Signaling (CCIS) link, and via an Integrated Services Digital Network (ISDN) communication link. In an alternative embodiment, the adjunct is an internal network element, such as a 4E switch, in which case the functioning of the adjunct remains the same but a connecting link is not required.

When a call is initiated by dialing the mobile party's PTN it is coupled to adjunct 24 via couplings 16, 14 and 22, and switches 14 and 18. The adjunct puts the call on "hold" and, based on the mobile party's identity (known through the PTN), retrieves the information necessary to page the mobile party. This information may be contained in a database internal to the adjunct or it may be read from an external data base (not shown). Adjunct 24 passes the necessary paging information to a paging service 28 via a fifth communication coupling 34. The paging service then broadcasts a paging activation signal and a caller identification signal, both intended for reception by two-way pager 10.

Pager 10 is equipped with: an alarm that is activated in response to the pager activation signal, a display that is responsive to the caller identification signal, and a keypad for specifying a forwarding number, bandwidth, protocol, or a special instruction. A mobile party who is alerted to a call may check the pager's display to identify the caller and/or the bandwidth and protocol of the originating station. The mobile party may then decide how to treat the call based on the displayed information, and use the pager to transmit a forwarding signal, represented by wireless link 38, to the paging service. One possible treatment is to complete the call to a called party telephone 32, in which case the forwarding signal includes call control parameters that are associated with a terminating telephone 32, such as a forwarding number, a bandwidth, and a protocol. The called party telephone may be a nearby telephone station or some remote telephone station, such as a secretary's station. In particular, to complete the call to the called party telephone the mobile party keys the telephone number, bandwidth, and protocol of the called party telephone into the pager using the pager's keypad, and then transmits the information to the paging service 28. Alternatively, the forwarding number, bandwidth, and protocol may be "keyed in" by choosing from among one or more adjunct provided choices that are transmitted to the pager via the paging service. In any case, the paging service passes the forwarding number to the adjunct where it is used to complete the call. The forwarding signal may also include a pager identification number, which can be used by the paging service to identify the transmitting pager.

Other possible call treatments include those that may be used when the mobile party is busy. If the mobile party is busy with a call when a subsequent call to the party's PTN is placed, the party may complete the subsequent call to an alternative terminating station, put the previous caller on hold and talk to the subsequent caller, or use the pager to transmit a conference call instruction to talk to both callers at the same time. Also, if the mobile party has completed the subsequent call but becomes free before the subsequent caller disconnects, the party may interrupt the completing of the subsequent call and redirect the call to the party.

In the configuration of FIG. 1, adjunct 24 completes the incoming call by holding the call at the adjunct while launching a second call from the adjunct to called party telephone 32. This second call is routed through: communication coupling 22, second network switch 18, communication coupling 30, third network switch 26, and sixth communication coupling 36. After the second call is complete the adjunct bridges the incoming call and the second call together so that the caller telephone is coupled to the called party telephone through the adjunct. As an alternative, the adjunct may merge the incoming call and the second call at the second network switch, in which case the adjunct drops from the call. Once the incoming call and the second call have been bridged, or merged, into a "completed call" the completed call may be answered by the mobile party at telephone 32.

A similar procedure may be used to implement special call handling instructions. For instance, in the case of a conference call between two callers and the mobile party, the adjunct may bridge, or merge the two incoming calls from the callers to an outgoing call to the mobile party.

In view of the foregoing description, it is understood that the system shown in FIG. 1 may also be used for transmitting a page signal to one-way pagers (not shown) which a fortiori cannot send forwarding signals, as well as to two-way pagers such as two-way pager 10. As will be understood further hereinbelow, one-way pagers, paged either by a two-way page communication system (e.g. FIG. 1) or a one-way communication system (not shown), also may include a pager duplicate sensor in accordance with an embodiment of the present invention.

Referring to FIG. 8, there is shown a block diagram containing the major elements of a existing telephone network system that preferably includes two-way paging, and may also provide one-way paging, and which may be used in accordance with an embodiment of the present invention, and which may implement call-by-call mode forwarding. As shown, a caller 40 seeks to establish communications with a mobile party, or "subscriber", 76 who is equipped with a two-way pager 77. The subscriber is assigned a Personal Telephone Number (PTN). The caller initiates an incoming call from a telephone 41 by dialing the mobile party's PTN. This incoming call is coupled to a local office 42 in the caller's locality through a telephone line 54. The local office 42 routes the call to an originating access switch 44 over a trunk line 56. Switch 44 may take the form of a digital switch, or an electronic switching system, such as an AT&T "4E" switch. For a more complete description of a 4E switch see, *The Bell System Technical Journal*, Vol. 56, No. 7, pp 1015–1320, pub. September 1977.

Once the call has been routed to switch 44, a Network Control Point (NCP) 66 receives the call's signaling information, including the dialed PTN, over a CCIS link 78. (Common Channel Interoffice Signaling refers the transmission of call control signaling between telephone offices, wherein a plurality of call control channels are multiplexed onto a single data link). The NCP uses the dialed number to retrieve routing information from the NCP's associated database. The NCP then routes the call over a trunk line 58 to a terminating access switch 46, which, like the originating access switch, may be a digital switch or a 4E switch. Switch 46 is connectable to an adjunct 68 via an ISDN link 80. The terminating access switch is capable of merging calls in response to a signal from the adjunct.

The ISDN link provides adjunct 68 with both the called number (subscriber's PTN) and the calling number (Automatic Number Identification number, or "ANI"). The adjunct retrieves the subscriber's record and current status information based on the PTN. From the subscriber's record the adjunct also determines whether or not the subscriber is provisioned to receive a Personal Identification Number (PIN). If the subscriber is so provisioned, adjunct 68 plays a standard prompting announcement to the caller after which the PIN is collected from the caller by the reception of up to 10 Dual Tone Multi Frequency (DTMF) digits (i.e. Touch Tone™ signals from a Touch Tone™ telephone). In a system using PINs, provision must be made for the case where a caller can not enter a PIN because the caller is at a rotary dial station and for the case where a caller does not respond to the prompt. In these two cases, adjunct 68 may allow for a time-out or an abbreviated dialing sequence (e.g., #) to denote that no PIN is forthcoming. Regardless of whether or not a PIN is collected, adjunct 68 proceeds to determine if subscriber 76 is busy with another call to the subscriber's PTN. It stores this determination, and then continues processing the call.

At this point, the adjunct plays an announcement that the system will "search" for subscriber 76. On a subscriber pre-provisioned basis, adjunct 68 may play an announcement to the caller 40 as an inducement to remain on the line while awaiting call completion. Meanwhile, the adjunct retrieves the subscriber's pager code (known from the PTN) and transmits the code along with the caller's ANI (or PIN, if so provisioned) to a satellite station 70 via a communication link 82.

The satellite station broadcasts the pager code and ANI (or PIN) to a paging transceiver 74 either through a satellite 72 or through a communication coupling 85. When the satellite is used, the pager code and ANI (or PIN) are transmitted to the satellite by way of a wireless link 84. The satellite, in turn, broadcasts the pager code and ANI (or PIN) to the transceiver by way of a wireless link 86.

Communication coupling 85 is used when the two-way pager is equipped for location registration. Under the location registration scheme, the two-way pager periodically sends out a signal from which the satellite station determines the region within which the mobile party is located. Once the satellite station knows the mobile party's region, it need only send the paging information to the transceiver associated with that region. In this manner, the need for a national broadcast to all transceivers via satellite is obviated. Thus, when location registration is used satellite station 70 may transmit the pager code and ANI (or PIN) to transceiver 74 via communication coupling 85. It will be understood by those of ordinary skill in the art that separate communication couplings from the satellite station to each transceiver are not required. Rather, signals to a transceiver that is not directly linked to the satellite station may be relayed to that transceiver over a transceiver network linked to the satellite station.

Regardless of whether satellite 72 or communication coupling 85 is used, the transceiver 74 broadcasts a paging signal that includes the pager code and ANI (or PIN) to the subscriber's pager. Broadcasting from transceiver 74 to pager 77 is represented by a wireless link 88. Upon receipt of the paging signal from the transceiver, the subscriber is alerted to the call and responds by sending a forwarding signal. The subscriber may include any one of a number of possible responses in the forwarding signal.

The subscriber may elect to forward the call to a telephone station of the subscriber's choice, in which case, the subscriber uses the two-way pager to transmit the number, bandwidth, and protocol of the desired terminating telephone station to the transceiver. In a preferred embodiment, the alerting page includes the bandwidth and/or protocol of the originating telephone 41. In such an embodiment the pager could display the bandwidth and/or protocol to the subscriber and the subscriber could chose a terminating station of matching bandwidth and/or protocol. As an alternative, the subscriber may not specify a terminating station at all, but rather, may forward the call to voice mail, or some other treatment, in which case the subscriber uses the pager to transmit a number associated with the desired treatment.

The independence of the paging and communication paths makes it possible for the subscriber to forward calls to the subscriber's PTN even when the subscriber is busy with an earlier call. This will be true regardless of whether the earlier call was directed to the subscriber's PTN or directly to the telephone station at which the subscriber answered the earlier call. Thus, in an illustrative scenario, the subscriber forwards a first caller to a nearby telephone station and picks up the call at that station. Then, while talking to the first caller, the subscriber forwards a second caller to a secretary, forwards a third caller to voice mail, and so on. The subsequent calls may be the forwarded without interruption of the first call and without the first caller becoming aware of them.

In addition to transmitting call forwarding instructions, the subscriber may transmit special call handling instructions, such as putting a caller on hold, switching between callers, creating a conference call, and redirecting a previously forwarded call. In one possible embodiment, these special instructions are implemented by assigning them a number which the subscriber sends to the transceiver in the same way that a forwarding number is sent. Thus, in an example of switching between callers, a busy subscriber who receives a second call may send the number 999 to the transceiver indicating that the first caller should be put on hold and the second caller forwarded to the subscriber's present telephone station. In an example of redirecting a previously forwarded call, a busy subscriber who has forwarded a subsequent call to voice mail but later becomes free to take the subsequent call, may interrupt the forwarding of the subsequent call by sending the number 000 to the transceiver before the forwarded caller disconnects, the 000 indicating that the forwarded call should be released from voice mail and forwarded to the subscriber.

Regardless of the call handling treatment chosen by the subscriber, the two-way pager transmits the forwarding signal to transceiver 74, as represented by wireless link 89. The transceiver relays the two-way pager's transmissions to satellite station 72, either through satellite 72 via wireless links 86 and 84, or through communication link 85. The satellite station then relays the subscriber's instructions to the adjunct via communication link 82, and the adjunct responds accordingly.

To complete the call to a called party telephone 52, the adjunct initiates a second call. The second call is routed to a third access switch 48 via a trunk line 60 (like switches 44 and 46, switch 48 may be a digital switch or a 4E switch). The third access switch then routes the second call to a local end office 50 based on the forwarding number, bandwidth, and protocol provided by the subscriber, the forwarding number being the number of called party telephone 52, to which the original call will be completed. The local end office couples the second call to the called party telephone via a telephone line 64. In completing the call, the adjunct and/or second access switch may use the bandwidth and/or protocol to allocate a suitable channel for the second call, and may use its knowledge of the subscriber's protocol to communicate with the subscriber according to that protocol (i.e. the adjunct or second access switch may act as a protocol translator).

Upon completion of the second call, the call from the caller to the PTN (on hold at the adjunct) and the second call are either bridged together within adjunct 68 (in which case the adjunct remains with the call), or merged at switch 46 (in which case the adjunct drops from the call). If the calls are bridged, the adjunct may implement the features of putting a caller on hold, switching between callers, creating a conference call, and interrupting a previously forwarded call. Whereas, if the calls are merged, switch 46 may implement these features under direction from the adjunct.

During the interval of time between the dialing of the subscriber's PTN to initiate a call and the final disposition of that call (the call set up time), an announcement may be played to the caller as an inducement to stay on the line while the call is processed.

Figure 2:
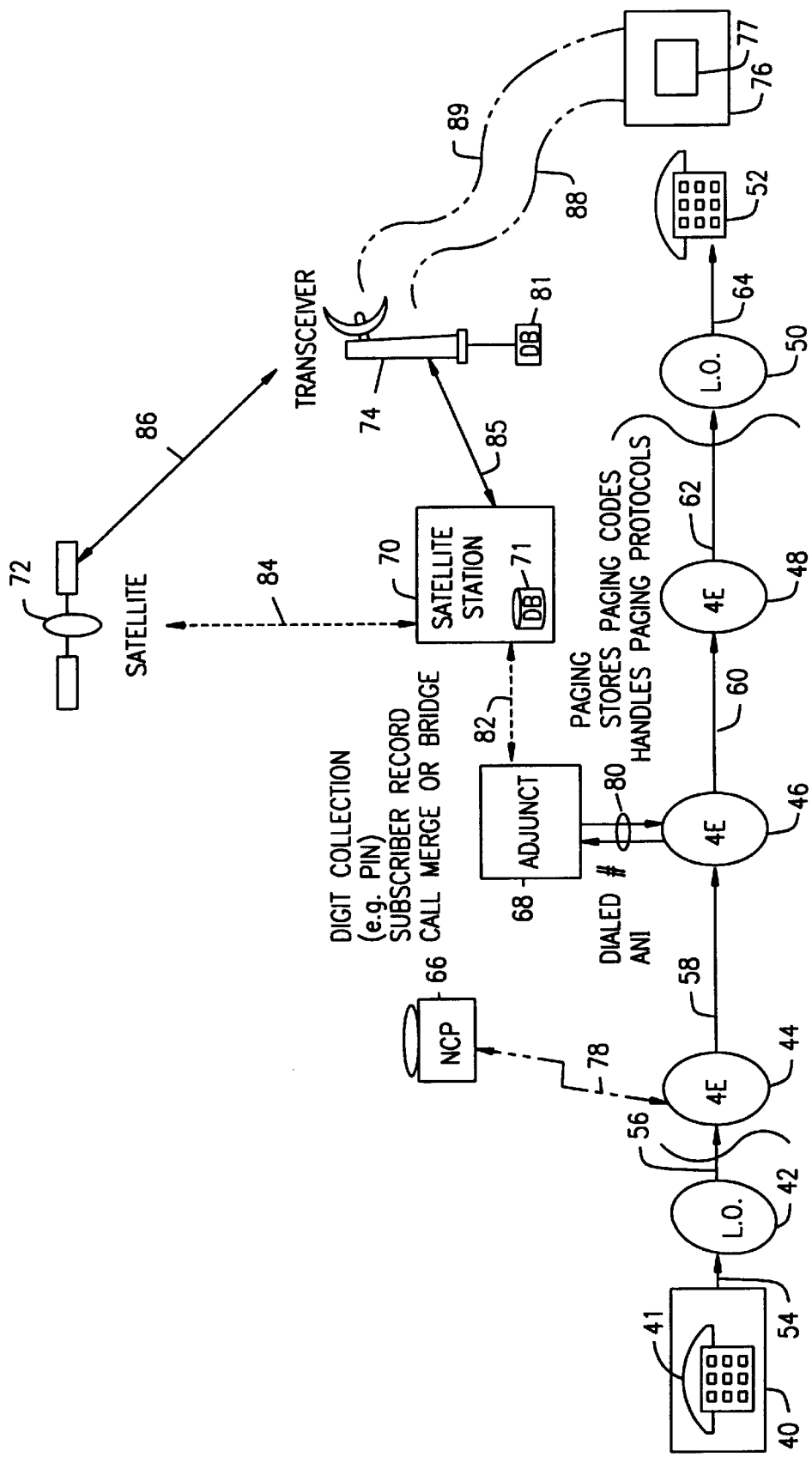
FIG. 2 is a block-schematic diagram of an existing telephone network incorporating the elements of FIG. 1.

It is understood, therefore, that the foregoing description of the communication systems shown in FIG. 1 and FIG. 2 are merely illustrative of the types of communication systems which may incorporate the present invention. The above-described communication systems preferably include features as disclosed in the above-cited patent applications which have been incorporated herein by reference, which features include: updating a forwarding number on a "registration" basis, on a "call-by-call" basis, and on a "secondary call" basis; responding to a call by a "revertive" or "caller examination" procedures; and network updating of pager off status.

As described, a one-way pager or a two-way pager (e.g. pager 10 or pager 77) may implement an embodiment of a duplicate page sensor in accordance with the present invention. A one-way pager which incorporates a first embodiment of the present invention may be used in the systems shown in FIG. 1 or FIG. 2, or in conventional one-way paging systems. A two-way pager which incorporates a first embodiment of the present invention preferably may be used in a two-way paging system such as those of FIG. 1 or FIG. 2.

Figure 3:
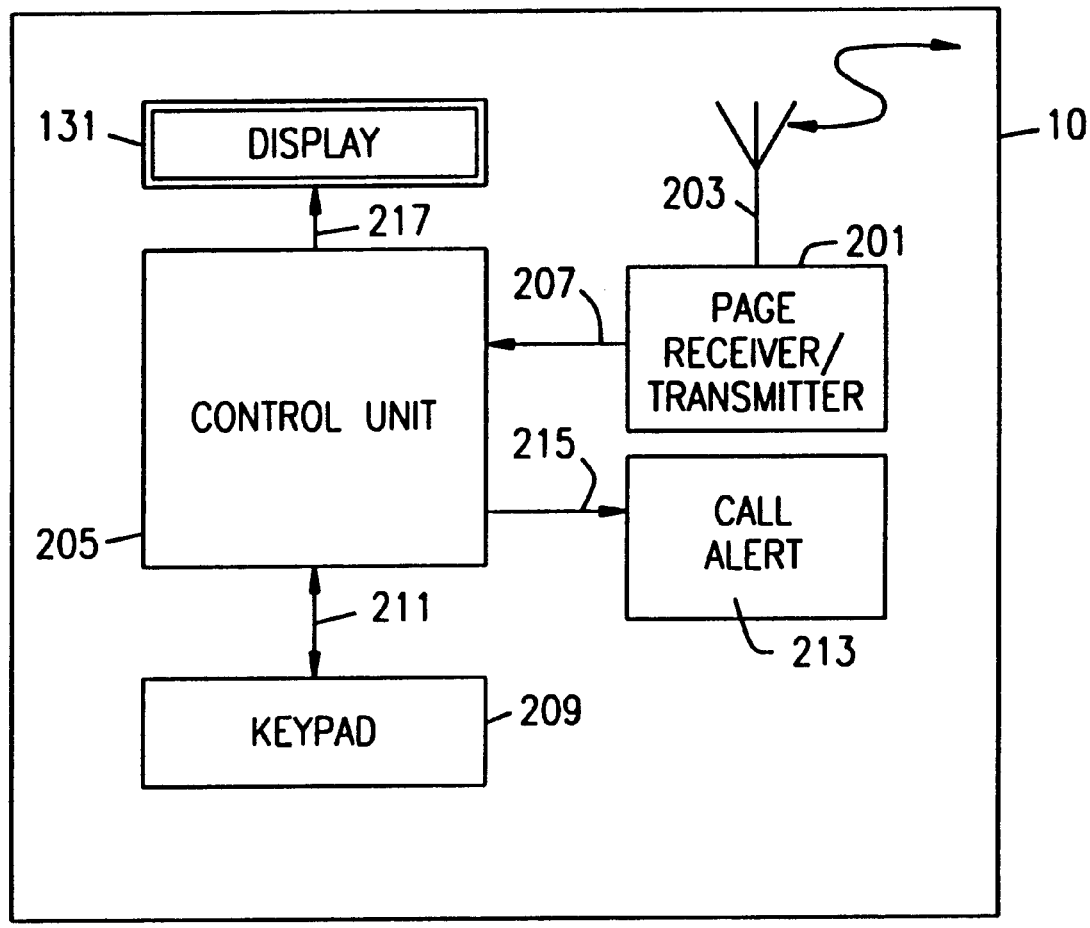
FIG. 3 is a functional block diagram of a paging device which may be used in accordance with the present invention.

FIG. 3 shows, in block diagram form, a more detailed view of a two-way pager 10 (or pager 77). Control Unit 205, which may be a conventional microcontroller, includes memory storage, a processor, and peripheral interfaces. These peripheral interfaces are coupled to audible call alert 213, display 219, keypad 209, and page transmitter/receiver 201 via communication links 215, 217, 211, and 207, respectively. Control Unit 205 executes a stored program for controlling operation of the pager in response to paging signals and user inputs. Via paging antenna 203, page transmitter/receiver 201 receives paging signals from, and transmits return pages (e.g., forwarding signals) to, paging service 28 or transceiver 74. Page transmitter/receiver 201 also stores a predetermined code (e.g., PTN or associated code) associating a mobile individual with pager 10 (77). In response to the reception of a paging signal containing paging information having this code, page receiver 201 sends to control unit 205, over link 207, the information contained in the paging signal, which typically includes the telephone number of the calling party. A one-way pager according to an aspect of the present invention would include corresponding functional elements as the two-way pager shown in FIG. 3, but would not include circuitry for transmitting signals to the paging system, would generally require a simplified keypad as well as a simplified program executed by controller, and would require reduced program and data storage, since there is no provision of return pages and return page functions. Preferably, however, both a one-way pager and a two-way pager according to the present invention will have a "duplicate page" time period settable via keypad 209, the duplicate page time period specifying a time interval within which two received pages having identical information are considered by the pager as being the same page. Such a time period may range, for example, from fractions of a second to ten or more seconds.

Figure 4A:
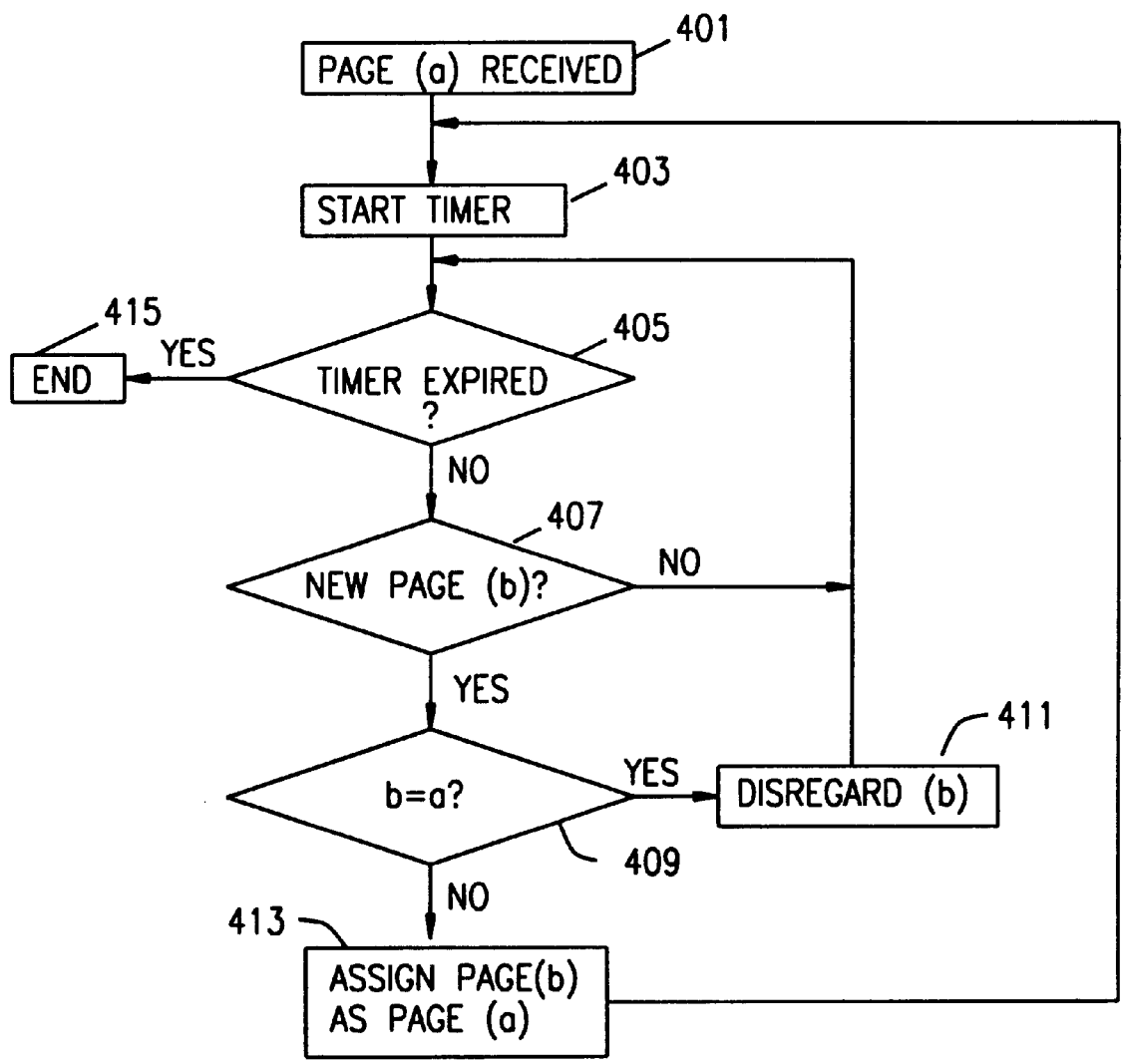
FIG. 4A and FIG. 4B are an operational flowcharts depicting steps executed by a paging device, such as that shown in FIG. 3, to detect duplicate pages in accordance with an embodiment of the present invention.

FIG. 4A illustrates an operational flow executed by a two-way pager, such as that shown in FIG. 3, as well as by a one-way pager, in response to an incoming page in accordance with a first embodiment of the present. After time has elapsed for greater than a predetermined duplicate page time interval, an incoming page, "page a", is received by the pager (step 401) from paging service 28 or transceiver 74, at which time a timer is started (step 403). In response to page a, the pager may further notify the subscriber/mobile individual via the display or alarm that a page has been received (not shown). The incoming page results, for example, from a caller dialing a PTN of a mobile individual, and a call being routed to the paging system which transmits a paging signal having an appropriate paging code and protocol for receipt by the pager associated with the called mobile individual, as described hereinabove in connection with FIG. 1 or FIG. 2.

If the timer expires before another page is received by the pager, then the pager returns to a state as before page a was received (steps 405, 407, and 413). If, however, a new page ("page b") is received before the timer expires (steps 405 and 407), then page b is compared with page a (step 409).

Then if, in step 409, the two pages match (i.e., are identical), page b is considered a duplicate page of page a, and is disregarded by the pager (step 411) such that there is no indication of page b being received (e.g. no activation of alarm or display, and no future storage of page b), and the pager continues to await an incoming page for comparison with page a until the timer has expired (steps 405 and 407). Once the timer expires, then the pager returns to a state as before page a was received, and any subsequently received page is not compared with a stored page but is considered as page a (step 405 and 415).

If, however, in step 409, the new page b is not the same page as page a, then the timer is restarted (step 403) and page b is considered as page a (step 413) for any future comparison with a new page b received before the reset timer expires (steps 405 and 407). In addition, since new page b is deemed an actual new page, pager notifies the subscriber by, for example, triggering the alarm and/or display.

It may be understood, therefore, that according to the operational flowchart of FIG. 4A, two sequential pages that are identical and are received within a predetermined time period, are considered the same page, the second of which is therefore disregarded. It may also be understood that FIG. 4A, for purposes of clarity of exposition, does not explicitly provide for identifying a duplicate page under the conditions of the pager sequentially receiving, within a predetermined timer period, a first original page, a second (or more than one) original page, and a duplicate of the first original page within the predetermined time period of the first original page. It may be appreciated, however, that there are various embodiments within the purview of the present invention for handling such scenarios, if desired. For instance, incoming pages may be stored in a buffer along with an arrival time, and a subsequently received page is compared for the first match in reverse time order (i.e., most recently received first) to those pages stored in the buffer which were received within the predetermined time interval. If the time interval expires before a new page is received, then the buffer is logically expunged, and the new page becomes the first entry in the buffer. Various implementations are possible for maintaining and updating the buffer according to elapsed time measured by a timer.

Figure 4B:
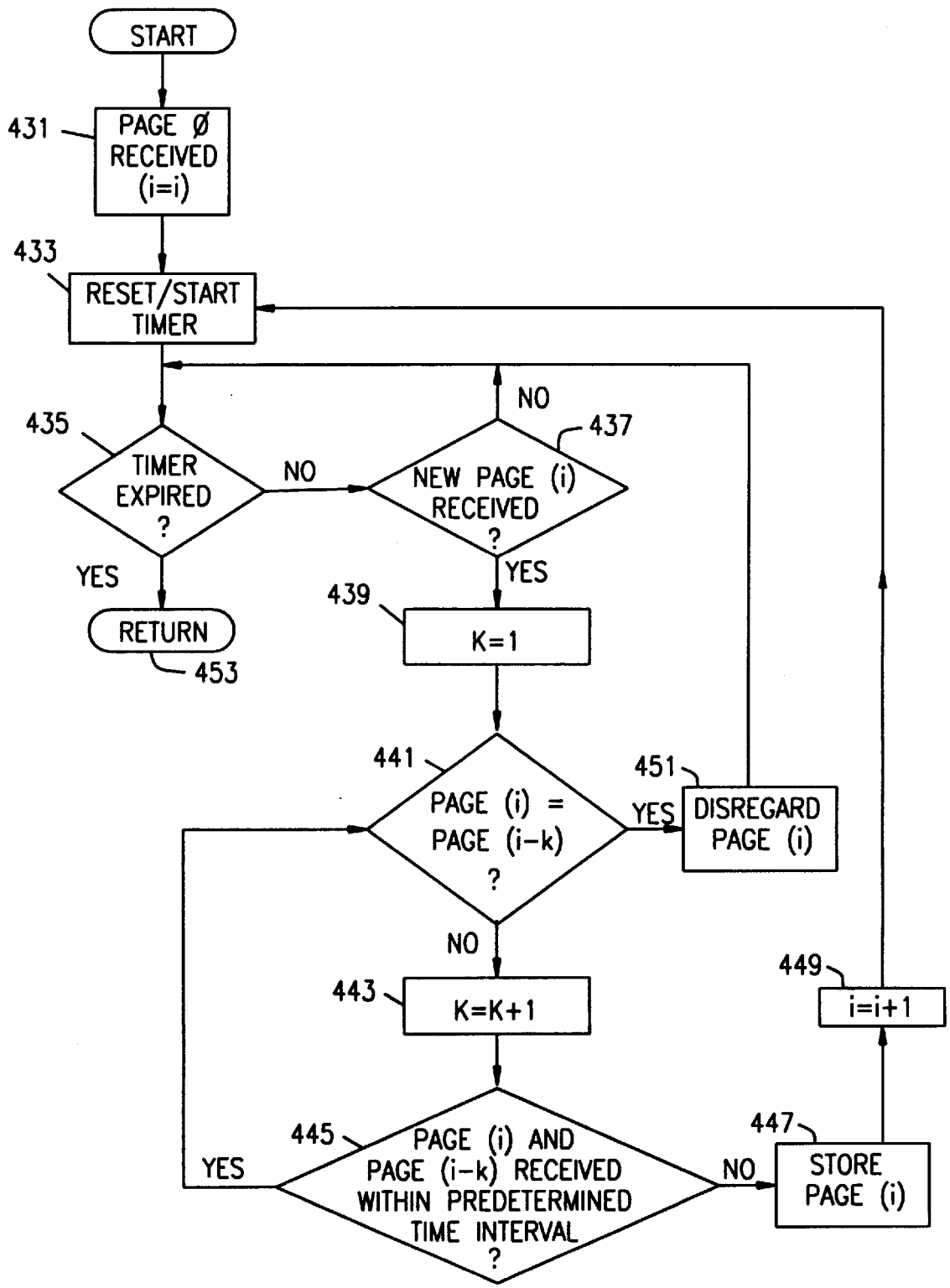

FIG. 4B illustrates an operational flow executed by a two-way pager, such as that shown in FIG. 3, as well as by a one-way pager, in response to an incoming page in accordance with alternative embodiment of the present which compares an incoming page to all pages received within an immediately preceding predetermined time period. After time has elapsed for greater than a predetermined duplicate page time interval, an incoming page, "page 0", is received by the pager (step 431) from paging service 28 or transceiver 74, at which time a timer is started (step 433). In response to page 0, the pager may further notify the subscriber/mobile individual via the display or alarm that a page has been received (not shown). The incoming page results, for example, from a caller dialing a PTN of a mobile individual, and a call being routed to the paging system which transmits a paging signal having an appropriate paging code and protocol for receipt by the pager associated with the called mobile individual, as described hereinabove in connection with FIG. 1 or FIG. 2.

If the timer expires before another page is received by the pager, then the pager returns to a state as before page 0 was received (steps 435, 437, and 453). If, however, a new page ("page (i)", where i represents an integer index initialized to 1 in step 431) is received before the timer expires (steps 435 and 437), then page (i) is compared with all previously received and stored pages that were received within a predetermined time interval until a first match (i.e., identical page) to page (i) is located (steps 439–445).

During the iterative steps comprising this comparison, if in step 441 a matching page is found (i.e., page (i–k) is identical to page (i)), then page (i) is considered a duplicate page of page (i–k), and is disregarded by the pager (step 451) such that there is no indication of page (i) being received (e.g. no activation of alarm or display, and no future storage of page (i)), and the pager continues to await an incoming page for comparison with stored, previously received pages until the timer has expired (steps 435 and 437). Once the timer expires, then the pager returns to a state as before page 0 was received, and any subsequently received page is not compared with a stored page but is considered as page 0 (step 435 and 453).

If, however, during the iterative steps comprising the comparison (i.e., steps 441–445) no stored page (i–k) is found which is identical to page (i), then page (i) is stored (step 447) in the buffer of previously received pages along with information indicating its time of receipt by the pager such that page (i) will be compared with any page that is received subsequent to page (i) and before the reset timer expires (steps 433–437). Since new page (i) is deemed an actual new page, not only is the timer reset/started (step 433) but also, the pager notifies the subscriber (not shown) of page (i) by, for example, triggering call alert 213 (e.g. alarm) and/or display 131.

Accordingly, the embodiment of the invention illustrated in FIG. 4B provides an alternative embodiment for implementing the present invention in a one-way pager or a two-way pager, and provides for recognition of duplicate pages even where there is one or more intervening pages between an original page and its duplicate. As a practical and statistical matter, however, a duplicate page typically will arrive at the pager before any intervening second original page.

It may be understood that there are many variations of this embodiment that are within the purview of the invention. For instance, there need not be setting and resetting of a timer as shown in FIG. 4B (i.e., steps 431–435 and 448 may be eliminated), since these steps are provided only to logically clear the buffer after more than the predetermined time interval has elapsed since the most recent actual (i.e., not duplicate) page has been received, and thus to avoid checking the first entry in the buffer after such time has elapsed. Instead, therefore, step 445 may be repositioned as occurring between steps 439 and 440.

In a further embodiment of the invention, in accordance with the embodiments presented in FIG. 4A and FIG. 4B, the paging signal broadcast by paging service 28 or by transceiver 74 includes a paging signal identifier inserted by the paging service (e.g., paging service 28, or satellite station 70 or transceiver 74) which facilitates verification of duplicate pages in comparing a received page to previously received pages (i.e., in step 409 of FIG. 4A, and in step 441 of FIG. 4B). Various implementations of such a paging signal identifier are possible. For instance, for each user, successive page signals may include a successively increased numerical value with a sufficient number of separate values (e.g., a four bit value) so as to effectively preempt the possibility of two independent pages actually generated by the paging service within the pager's maximum predetermined time interval having the same paging signal identifier. Alternatively, each paging signal generated by paging service may include an arbitrary (e.g., random) number of sufficient length (e.g., ten bits) so as to result in a sufficiently small probability that any two pages generated by the paging service within the pager's maximum predetermined time interval will have identical paging signal identifiers. Thus, even if the same caller (e.g., as represented in the paging signal by the caller's ANI) places, within the set predetermined time interval of the called paging service subscriber's pager, two separate calls which result in two independent paging signals generated within the predetermined time interval, the comparison of the respective pager identifier information for the two pages will prevent the pager from erroneously identifying the second call as a duplicate page, despite all information in the two paging signals, exclusive of the paging signal identifier, being identical. In embodiments of the present invention which incorporate such a paging signal identifier, in certain implementations it may be possible for the pager to only compare the paging signal identifiers in order to identify duplicate pages. Alternatively, the pager may first compare the paging signal identifiers, and then compare the remaining respective paging signal information (e.g., ANIs) only if the paging signal identifiers for the respective pages are identical. Of course, another alternative is to first compare the other paging signal information (e.g. ANIs), and then compare the respective paging signal identifiers if the other paging signal information for the respective pages are identical.

Figure 5:
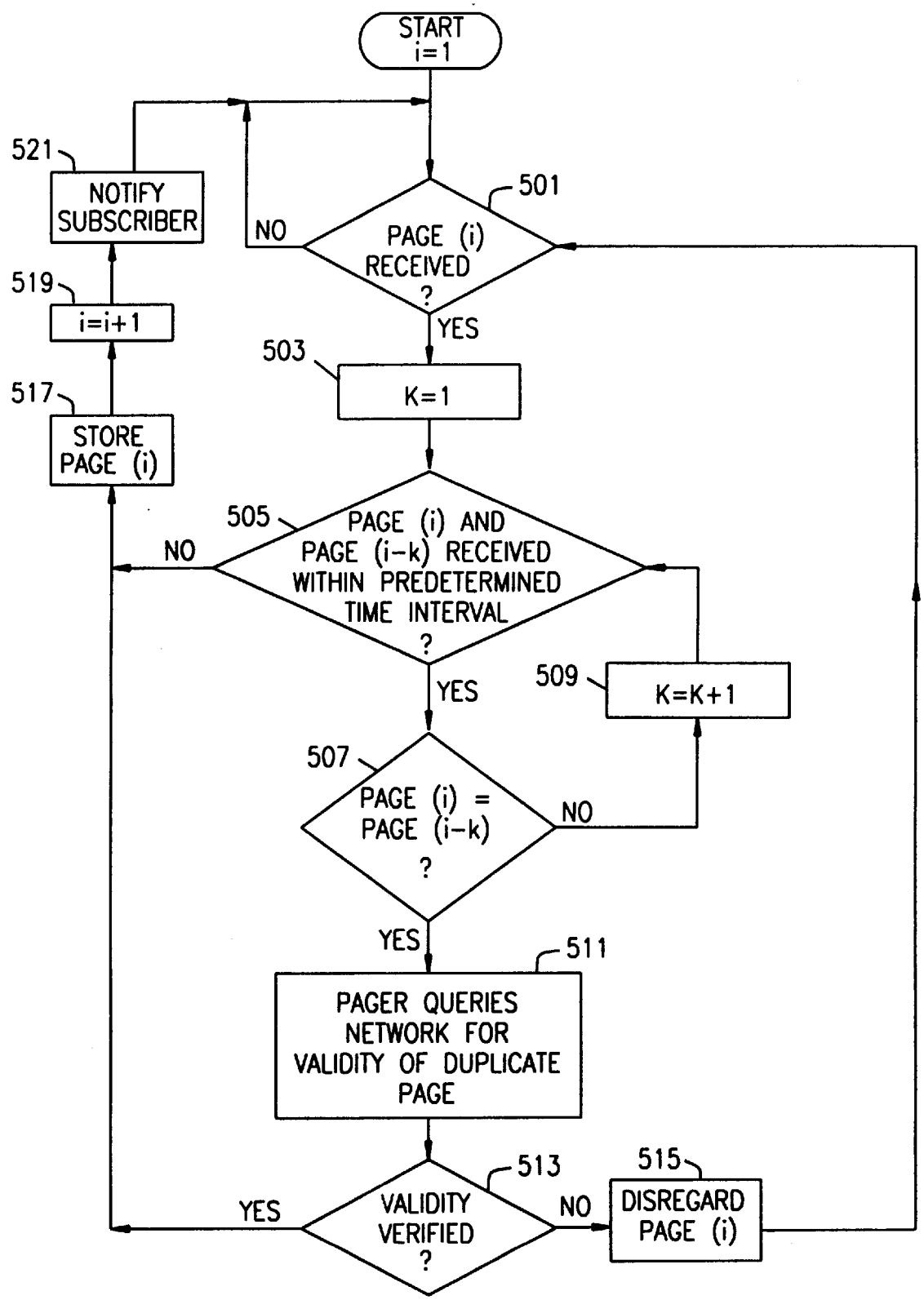
FIG. 5 is an operational flowchart depicting steps executed by a two-way paging device in detecting duplicate pages in accordance with another embodiment of the present invention.

In FIG. 5, an operation flow is described for a preferred embodiment of the present invention which is practiced in accordance with a two-way paging system, and particularly is not suited for a one-way pager. In this embodiment, a mobile person is equipped with a two-way pager and is assigned a Personal Telephone Number (PTN). The mobile person uses the pager to transmit one of several available types of forwarding signals to a paging service and/or network via the paging service. These reverse paging signals may be generated by the mobile user as a response to a paging signal received by the two-way pager, or by the mobile user as an instruction to the paging system and/or network before any incoming paging signal is received. Preferably, the two-way paging system is provided according to the systems described hereinabove in connection with FIG. 1 and FIG. 2, and according to the above-cited patent applications, and includes the registration, call-by-call forwarding, secondary forwarding, revertive calling, and pager status detection features disclosed therein.

In addition, in accordance with the present invention, the two-way paging system of FIG. 1 includes a database coupled to paging system 28 which stores information identifying each page transmitted by the paging system. Similarly, in accordance with the present invention, the two-way paging system of FIG. 2 includes database 71 coupled to (e.g., either internal or external) satellite station 70 or database 81 coupled to (e.g., either internal or external) transceiver 81. Database 71 and database 81 store information identifying each page transmitted via satellite station 70 and via transceiver 74, respectively. The hereinbelow described pager duplicate sensor applies to any paging signal received by two-way pager 10 or by two-way pager 77 in the respective systems.

Referring now to FIG. 5, the steps executed by the two-way pager in detecting and obtaining verification of duplicate pages are now described. Upon receiving a page, page (i), in step 501, a locally executed duplicate page sensing routine (steps 503–507) is invoked to determine if a page received within an immediately preceding predetermined time interval is identical to page (i).

If the incoming page is determined as not being identical to any pages received within the predetermined time interval, then the page is deemed a new page, which is stored (step 517) by the pager for comparison to any pages subsequently received within the predetermined time interval, and the paging device notifies the subscriber of the new page (step 521). If, in step 507, the incoming page is determined as being identical to page (i–k) which was previously received and stored by the pager within the preceding predetermined time interval, then the incoming page is deemed an apparent duplicate page.

In response to sensing the apparent duplicate page, two-way pager sends a reverse page query to the paging system (step 511), requesting confirmation as to the invalidity of the apparent duplicate page. The reverse page includes information that identifies the apparent duplicate page (e.g., including page code, calling party ANI), and the paging system compares this information with that stored in database 27, or in database 71 or database 81 to determine whether two separate pages matching the apparent duplicate page were transmitted by the paging system, thus indicating that the apparent duplicate page is actually a valid original page, or whether only one page corresponding to the paging information was transmitted by the paging system, and thus that the apparent duplicate page is actually a duplicate page. The paging system (e.g., paging service 28 or satellite station 70 or transceiver 74, depending on the implementation) then sends a duplicate page validity signal, indicative of the validity or invalidity of the apparent duplicate page as an actual original page, to the two-way pager.

It may be appreciated that various methods may be implemented for maintaining page information in database 27, database 71, or database 81, and comparing the page information with apparent duplicate pages. For instance, for each subscriber, the paging system may maintain and compare only those pages transmitted to the pager which were transmitted within a storage time period which is greater than a maximum predetermined time period settable in the pagers by an amount which would account for at least the time elapsed between the paging system receiving a reverse page query and the pager receiving the page which resulted in the reverse page query. Alternatively, the reverse page query may include a signal (e.g., time field) indicating: the pager's current predetermined time period; and/or the time elapsed between sending the reverse page signal and receiving the original page and/or duplicate page. Then, the paging system may compare the page identified in the reverse page query with each stored page which was generated within a time frame that is based on the time signal information provided by the reverse page query.

Similarly, an ordinarily skilled artisan appreciates that various systems may be implemented for controlling information read from, and written to, database 27, database 71, or database 81, and for comparing the page information stored in these databases with apparent duplicate pages. For instance, with reference to FIG. 2, where database 71 (81) is external or internal to satellite station 70 (transceiver 74), the database may include a separate processor which: controls reading to, and writing from, the database via communication with a processor located in satellite station 70 (transceiver 74); and communicates with the processor located in satellite station 70 (transceiver 74) to effect the comparison either by communicating the stored paging information to the processor located in satellite station 70 (transceiver 74) which will execute the comparison, or by executing the comparison itself and communicating a signal indicative of the comparison to the processor located in satellite station 70 (transceiver 74). Alternatively, where the database is internal to satellite station 70 (transceiver 74) such a database may be under control of a processor which is also operative in controlling generation of paging signals and/or control of transceiver 74.

Upon two-way pager receiving a response from the paging system in query step 511, if the second page is confirmed as a valid page (step 513), then page (i) is stored (step 517) by the pager for comparison to any pages subsequently received within the predetermined time interval, and the paging device notifies the subscriber of the new page (step 521). If, however, in step 513 the second page is confirmed as an invalid page, the two-way pager disregards the second page (step 515) and returns to awaiting receipt of an incoming page.

This preferred embodiment of the present invention, therefore, enhances the reliability of the duplicate page sensing system by providing verification of duplicate pages sensed by the pager. It may be understood that alternative embodiments may be provided by adapting the operational flowcharts of FIG. 1 or FIG. 2 to provide verification by the paging system of duplicate pages sensed by the pager. In addition, although an apparent alternative to the foregoing two-way paging system embodiment, which relies on the pager to sense duplicate pages and on the communications system to confirm the validity of the duplicate page, is for the pager not to carry out any duplicate page sensing function but for the paging system to identify duplicate reverse pages by checking each reverse page against a database of reverse pages and/or original pages, such an approach places a heavy burden on the paging system resources, since each reverse page must be checked. Thus, according to a preferred two-way paging communications system embodiment of the present invention, the duplicate page sensing process is distributed among the pagers, as described hereinabove, to reduce paging system processing requirements.

It may be appreciated, therefore, that the present invention provides many features, advantages, and attendant advantages for mobile individuals using one-way pagers or two-way pagers, for callers of mobile individuals in a two-way paging system, and for two-way paging communication systems. A mobile individual/subscriber using a one-way pager is not troubled or frustrated by receiving apparent, but unconfirmed, duplicate pages. A mobile individual/subscriber using a two-way pager is additionally benefited by avoiding the decision and action of generating a reverse page in response to the duplicate page, which further may result in lost calls, which are particularly egregious where the pager is used for business. Concomitantly, a caller of a mobile-individual using a two-way pager is not frustrated or confused by "mid-call" changes in the response received by the caller, or by disconnections associated with calls "lost" by the network due to "mid-call" changes in call handling instructions. Further, the two-way paging system and the communication network to which it is coupled are not burdened by demands of handling reverse pages generated in response to a duplicate page, or of handling such reverse pages coherently with call handling already invoked in response to a first reverse page generated in response to a valid, original page.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

We claim:

1. In a paging communication system including a paging system and a pager, a method for identifying duplicate pages comprising the steps of:

receiving an incoming page at said pager; and comparing, in said pager, information in said incoming page with information stored for one or more page signals received by said pager within a predetermined time interval immediately precedent to receiving said incoming page, to identify whether said incoming page is a duplicate of a first page represented by said one or more page signals, wherein both the duplicate page and the first page are determined as associated with a single, common request for the paging system to page the pager based on being received within said predetermined time interval relative to each other.

2. The method according to claim 1, further comprising the step of disregarding said incoming page when said comparing step identifies that said incoming page is a duplicate of said one or more page signals.

3. The method according to claim 1, wherein said pager identifies said incoming signal as an original page in the event that said incoming signal does not match said one or more paging signals in said comparing step.

4. The method according to claim 1, further comprising the step of said pager storing information for said incoming page in the event that said incoming page does not match said one or more paging signals in said comparing step.

5. The method according to claim 1, further comprising the step of notifying receipt of said incoming page in the event that said incoming page does not match said one or more paging signals in said comparing step.

6. The method according to claim 1, further comprising, in the event that said comparing step identifies said incoming page as a duplicate of said one or more page signals, the steps of:

sending a reverse page query from said pager to said paging system, said reverse page query including information for said incoming page; and comparing in said paging system, in response to receiving said reverse page query, said information for said incoming page with stored information of page signals transmitted to said pager to verify whether said incoming page is a duplicate page, said stored information located in a database coupled to said paging system; and sending from said paging system to said pager a duplicate page verification signal that indicates whether said duplicate page is an original page directly generated by said paging system or an actual duplicate page.

7. The method according to claim 6, further comprising, in the event that said duplicate page verification signal indicates that said incoming page is an original page, the step of storing information for said incoming page in said pager.

8. The method according to claim 6, further comprising the step of said pager notifying receipt of said original page in response to said duplicate page verification signal indicating that said duplicate page is an original page.

9. The method according to claim 6, further comprising the step of said pager disregarding said incoming signal in response to said duplicate page verification signal indicating that said duplicate page is an actual duplicate page.

10. The method according to claim 1, wherein said information from said signal includes an automatic number identification of said caller communication device, and said stored information for one or more paging signals includes respective automatic number identification information for said one or more paging signals.

11. The method according to claim 1, wherein said information from said signal and said stored information for one or more paging signals includes respective paging signal identifiers generated by said paging system.

12. The method according to claim 1, wherein said stored information for one or more paging signals includes data indicating respective times that said one or more paging signals were received by said pager.

13. In a paging communication system including a paging system and a plurality of two-way paging devices, a method executed in the paging system comprising the steps of:

transmitting a page signal for receipt by a two-way pager from among said plurality of two-way paging devices;

receiving a reverse paging signal from said two-way pager, said reverse paging signal including information identifying a signal received by said pager; and comparing said information of said reverse paging signal with transmitted page information stored in a database, said transmitted page information identifying page signals transmitted by the paging system to said two-way pager, to determine whether said signal received by said two-way pager is an original page signal directly transmitted by said paging system or a duplicate page.

14. The method according to claim 13, further comprising the step of:

transmitting a duplicate page validity signal to said associated two-way pager, said duplicate page validity signal indicating whether said signal received by said two-way pager is an original page signal or a duplicate page.

15. The method according to claim 13, further comprising the steps, executed by said associated two-way pager before said receiving step, of:

receiving a signal having a code that uniquely identifies the two-way pager;

comparing information from said signal with stored information for one or more paging signals received within a predetermined time interval prior to said signal;

identifying said signal as a possible duplicate page in the event that said signal matches one of said one or more paging signals; and sending, in the event that said identifying step identifies said signal as a possible duplicate page, said reverse page signal to verify whether said possible duplicate page is an actual duplicate page.

16. The method according to claim 13, further comprising the step of said paging system maintaining said database of transmitted pages for each said plurality of two-way paging devices.

17. In a paging communication system including a paging system and a pager, a method for identifying duplicate pages comprising the steps of:

receiving an incoming page at said pager;

comparing, in said pager, information in said incoming page with information stored for one or more page signals received by said pager within a predetermined time interval immediately precedent to receiving said incoming page, to identify whether said incoming page is a duplicate of said one or more page signals; and in the event that said comparing step identifies said incoming page as a duplicate of said one or more page signals, executing the steps of:
  (a) sending a reverse page query from said pager to said paging system, said reverse page query including information for said incoming page; and
  (b) comparing in said paging system, in response to receiving said reverse page query, said information for said incoming page with stored information of page signals transmitted to said pager to verify whether said incoming page is a duplicate page, said stored information located in a database coupled to said paging system; and
  (c) sending from said paging system to said pager a duplicate page verification signal that indicates whether said duplicate page is an original page directly generated by said paging system or an actual duplicate page.

18. The method according to claim 17, further comprising, in the event that said duplicate page verification signal indicates that said incoming page is an original page, the step of storing information for said incoming page in said pager.

19. The method according to claim 17, further comprising the step of said pager notifying receipt of said original page in response to said duplicate page verification signal indicating that said duplicate page is an original page.

20. The method according to claim 17, further comprising the step of said pager disregarding said incoming signal in response to said duplicate page verification signal indicating that said duplicate page is an actual duplicate page.

* * * * *